US012806724B2

(12) United States Patent
Nylander

(10) Patent No.: US 12,806,724 B2
(45) Date of Patent: Nov. 24, 2026

(54) TOOL HOLDER FOR A MACHINE WITH AN IMPROVED SAFETY SYSTEM

(71) Applicant: OilQuick AB, Hudiksvall (SE)

(72) Inventor: Erik Nylander, Hudiksvall (SE)

(73) Assignee: OilQuick AB, Hudiksvall (SE)

( * ) Notice: Subject to any disclaimer, the term of this patent is extended or adjusted under 35 U.S.C. 154(b) by 346 days.

(21) Appl. No.: 18/408,073

(22) Filed: Jan. 9, 2024

(65) Prior Publication Data

US 2024/0227101 A1 Jul. 11, 2024

(30) Foreign Application Priority Data

Jan. 10, 2023 (EP) .................................... 23151024

(51) Int. Cl.

| | |
|---|---|
| ***B23Q 1/70*** | (2006.01) |
| ***B23Q 3/10*** | (2006.01) |
| ***E02F 3/36*** | (2006.01) |
| ***E02F 3/96*** | (2006.01) |
| ***E02F 9/26*** | (2006.01) |
| *B23Q 9/02* | (2006.01) |

(52) U.S. Cl.

CPC ............. *B23Q 3/106* (2013.01); *B23Q 1/706* (2013.01); *B23Q 3/105* (2013.01); *E02F 3/3604* (2013.01); *E02F 3/3663* (2013.01); *B23Q 9/02* (2013.01)

(58) Field of Classification Search

CPC ........ B23Q 3/106; B23Q 3/105; B23Q 1/706; B23Q 9/02; E02F 9/2278; E02F 3/3618; E02F 3/3622; E02F 3/3627; E02F 3/3663; F16B 5/06; F16L 37/56

See application file for complete search history.

(56) References Cited

U.S. PATENT DOCUMENTS

| | | | | |
|---|---|---|---|---|
| 8,678,697 | B2 * | 3/2014 | Monaghan ............ | E02F 3/3618 37/468 |
| 9,562,346 | B2 * | 2/2017 | Jonsson .................... | E02F 9/24 |

FOREIGN PATENT DOCUMENTS

| | | | |
|---|---|---|---|
| CH | 700 307 | A1 | 7/2010 |
| EP | 3 040 482 | A1 | 7/2016 |
| GB | 2 332 417 | A | 6/1999 |
| WO | WO 2004/067855 | A1 | 8/2004 |

* cited by examiner

*Primary Examiner* — Robert E Pezzuto
(74) *Attorney, Agent, or Firm* — Burr & Forman LLP; Nathaniel T. Quirk, Esq.

(57) ABSTRACT

A tool holder for a machine includes a frame and an actuator that can be moved from a retracted state to an extended state and back. The frame includes a hook shaped recess having an opening and a cut out arranged at a distance from the hook shaped recess so that a front bracket pin of a tool can releasably connect to the hook shaped recess by entering the opening and a rear bracket pin of the tool can releasably connect to the cut out. The actuator is fixedly connected to the frame with one end. The actuator includes a locking element that is designed to change the shape of the cut out in the extended state of the actuator. The actuator includes a securing assembly designed to reduce the size of the opening of the hook shaped recess in the retracted state of the actuator. The rear bracket pin can enter the cut out in the retracted state of the actuator and the front bracket pin can enter the hook shaped recess in the extended state of the actuator.

17 Claims, 3 Drawing Sheets

TOOL HOLDER FOR A MACHINE WITH AN IMPROVED SAFETY SYSTEM

TECHNICAL FIELD

The invention relates to the field of tool holders and quick coupling units in particular tool holders for machines, such as excavators, foresting machines, building machines, cranes and so on. The invention relates in particular to an improved safety mechanism that substantially reduces the risk of accidents related to such tool holders and quick coupling units.

BACKGROUND OF THE INVENTION

Tool holders are widely used in order to connect various tools such as shovels, hammers, vibrators, claw arms, cutters and so on to excavators, forestry machines or robotic machines. The tool holders are thereby adapted to fit onto standardized tool adapters typically comprising a pair of bracket pins, the tool adapters being rigidly connected to the tool. The tool holders typically comprise a hook shaped cut out, which can engage one of the bracket pins and a cut out interacting with a locking element that is connected to an actuator, whereby the other of the bracket pins can be arranged in said cut out and locked by extending the locking element via the actuator. This connection has proven to be useful and variations of it are widely used in the construction industry, the foresting industry and many other heavy industries. Problems that can arise relate to the issue that one of the two bracket pins is typically hidden from the operators view and that the hook shaped cut out does not lock the bracket pin but just engages the bracket pin like a hook does with an opening through which the bracket pin theoretically can still escape in case a machine arm is tilted or due to excessive oscillation of the tool on the tool holder.

Typically, the process of coupling a tool to a tool holder comprises the following locking sequence or steps:

a) Hooking a front bracket pin of a tool into a hook shaped recess of the tool holder;
b) Tilting the tool holder so that a rear bracket pin is snug embedded in a cut of the tool holder; and
c) Extending a locking element so that a shape of the cut out is changed leading to a locking of the rear bracket pin in the cut out, which in turn leads to a locking of the front bracket pin due to form restriction.

A typical unlocking sequence or release of the tool from the tool holder typically comprises the following steps:

d) Putting the tool on the ground in a stable manner;
e) Retracting the locking element so that the cut out is opened so that the rear bracket pin can be disengaged from the cut out;
f) Tilting the tool holder so that the rear bracket pin is set free from the cut out; and
g) Lifting the arm of the machine and therewith the tool holder so that the hook shaped recess is disengaged from the front bracket pin and the tool therewith completely free from the tool holder or quick coupling unit.

A problem that arises with this locking sequence is that during steps a), b), d), e) and partially f) the tool is not 100% secured to the tool holder, which can lead to accidents with falling tools in particular if the operator tilts the machine arm in the wrong way, if the machine is moving or if the tool is oscillating. Accidents with unsecured or falling tools have to be prevented at all cost as they can lead to injuries or fatalities and/or material damage.

The WO 2004067855 A1 discloses a tool holder where the above described coupling—and decoupling sequences are used.

Another problem that may arise is that the operator falsely assumes that the rear bracket pin is properly locked when it is not for example due to jamming or false positioning of the rear bracket pin, which may also lead to dangerous situations and potential accidents as the operator will start to operate the machine as if the tool was properly locked, which can also lead to a falling tool that causes potential hazard.

In light of the above risks and problems a new locking mechanism for a tool holder, which allows to make the above-mentioned locking and unlocking sequences a) to f) safer is herewith disclosed.

SUMMARY OF THE INVENTION

An object of the present invention is to provide a tool holder that is safe, reliable and robust.

The inventor of the present invention has realized that it is possible to design a locking mechanism that prevents that any of the cut outs or hook shaped recesses in the tool holder from being open so that a front- or rear bracket pin of a tool can disengage without being hindered in a form-fit manner. In particular the inventor realized that an actuator, which is typically used to lock a rear bracket pin of the tool in a cut-out (WO 2004/067855 A1), can be used to also securely lock the front bracket pin in the hook shaped recess in a form-fit manner and that this in particular can be done sequentially. The solution presented by the inventor locks one of the bracket pins of the tool at any time the tool is coupled or partially coupled to the tool holder.

Disclosed herein is a tool holder for a machine comprising a frame and an actuator that can be moved from a retracted state to an extended state and back. The frame comprises a hook shaped recess having an opening and a cut out arranged at a distance from the hook shaped recess so that a front bracket pin of a tool can releasably connect to the hook shaped recess by entering via the opening and a rear bracket pin of the tool can releasably connect to the cut out. The actuator is fixedly connected to the frame with one end, the actuator further comprises a locking element that is designed to change the shape of the cut out in the extended state of the actuator. The actuator further comprises a securing assembly designed to reduce the size of the opening of the hook shaped recess in the retracted state of the actuator, whereby the rear bracket pin can enter the cut out in the retracted state of the actuator and wherein the front bracket pin can enter the hook shaped recess in the extended state of the actuator.

As explained above, typically, the process of coupling a tool to a tool holder comprises the following locking sequence or steps:

i) Hooking the front bracket pin of the tool into a hook shaped recess of the tool holder and moving the actuator from the extended state into the retracted state thereby securing the front bracket pin in the hook shaped recess and at the same time opening the cut out so that the rear bracket pin can be received in the cut out;
ii) Tilting the tool holder so that a rear bracket pin is snug embedded in a cut of the tool holder; and
iii) Extending the actuator so that a locking element changes a shape of the cut out leading to a locking of the rear bracket pin in the cut out, which in its turn locks the front bracket pin due to form fit or form restriction.

A typical unlocking sequence or release of the tool from the tool holder comprises the following steps:

iv) Putting the tool on the ground in a stable manner;

v) Moving the actuator from the extended state into the retracted state thereby opening the cut out and locking the front bracket pin via the securing assembly so that the rear bracket pin can disengage from the cut out;

vi) Tilting the tool holder so that the rear bracket pin is disengaging from the cut out; and vii) Moving the actuator from the retracted state/position to the extended sate/position thereby enlarging the opening of the hook shaped recess so that the front bracket pin can be disengaged by lifting the arm of the machine.

The above-described and herein disclosed tool holder increases the safety during the steps i), ii), v), vi) and partially vii) for the following reasons:

Before performing step i) the actuator has to be extended so that the opening of the hook shaped recess is equal to or greater than the diameter of the front- and rear bracket pin of the tool, which means that the front bracket pin can engage in the hook shaped recess. During this extended state of the actuator the locking element is blocking the rear bracket pin from entering the cut out, which means that prior entering step ii) the actuator needs to be retracted, thereby inevitably securing the front bracket pin in the hook shaped recess by changing the size of the opening to smaller than the diameter of the front bracket pin via the securing assembly. Now step ii) can be performed once the rear bracket pin is snug engaged in the cut out and the locking element may secure the rear bracket pin in the cut out and the front bracket pin in the hook shaped recess.

The presented solution will therewith increase the safety during steps i), ii) but in particular during step i).

It may for instance further be possible to prevent the machine arm or the entire machine from lifting during step i) and only allow a machine arm operation once step i) is completed, thus once the actuator is retracted and the front bracket pin is secured in the hook shaped recess by the securing assembly.

The tool holder according to the invention also improves the safety of the tool manipulation in particular during decoupling of the tool from the tool holder and therewith in particular during the above presented steps v), vi) and vii). The tool is safely secured in the tool holder during the entire decoupling sequence from iv) to vii) until the actuator is moved from the retracted state to the extended state thereby enlarging the opening of the hook shaped recess via the securing assembly so that the front bracket pin can disengage from the hook shaped recess.

The tool holder disclosed herein therewith increases safety substantially.

It is to be noted that the retracted position or state of and the extended position or state of the actuator may be interchanged. Likewise, may the position of the rear bracket pin and the front bracket pin and therewith the hook shaped recess and the cut out be interchanged.

In an embodiment disclosed herein the locking element is designed to change the shape of the cut out from a cut out to a hook shaped cut out as seen in a cross-sectional plane being cut through the tool holder and the cut out, said cross sectional plane being oriented perpendicular to a longitudinal axis of the rear bracket pin of the tool, when said rear bracket pin is snug embedded in the cut out.

The change of the shape of the cut out to a hook shaped cut out leads to a form fit connection between the hook shaped recess and the now hook shaped cut out.

In an embodiment the hook shaped recess and the hook shaped cut out may have openings that are facing one another or facing away from one another.

This way a form fit connection may be achieved.

In a further embodiment the opening is equal or greater than a diameter of the rear- or front bracket pin of the tool, when the actuator is in the extended state, and wherein the opening is smaller than a diameter of the rear- or front bracket pin of the tool, when the actuator is in the retracted state.

This may lead to the above locking effects once the actuator is retracted or extended using the securing assembly to change to the size of the opening.

In another embodiment the size of the opening is measured in a cross-sectional plane cut through the tool holder and the hook shaped recess, said cross sectional plane being oriented perpendicular to a longitudinal axis of the front bracket pin of a tool, when said front bracket pin is snug embedded in the hook shaped recess.

The above may mean that the securing assembly and the hook shaped recess are not arranged in the same plane or cross-sectional plane, however the invention still works independent of the depth position of the securing assembly and the hook shaped recess as seen in any cross-sectional plane.

In a further embodiment the actuator may comprise a rod and a housing into which the rod can retract and from which the rod can extend, wherein the rod is connected to the frame and wherein the housing is moving in relation to the frame when the actuator is moving between the retracted and the extended state and wherein the securing assembly and the locking element are fixedly connected to the housing.

The rod and the housing may be part of a pneumatic or hydraulic cylinder solution, a cork-screw solution or any other suitable solution such as an electric motor arrangement using induction or magnetism.

In an embodiment the securing assembly and the locking element extend in opposite directions from the housing and said opposite directions may be parallel to a movement path defined by the actuator.

This may lead to an efficient and straight forward design of the tool holder.

In a further embodiment the frame may comprise at least two side plates and a web, the web interconnecting the at least two side plates, said side plates being arranged parallel to one another and wherein each of the at least two side plates comprise the cut out and the hook shaped recess.

The above design may lead to a stable embedding of the front- and rear bracket pin in the tool holder.

The actuator may be connected to the web and the frame may further comprise a motion link in which a part of the housing is engaged for controlling the movement of the housing when the actuator is extending and retracting.

In an embodiment the housing of the actuator may be H-shaped, wherein each leg of the H-shape comprises one hydraulic or pneumatic cylinder.

The tool holder may be a tool adapter, a tilt rotator, a rotator, a tiling device or a quick coupling unit.

Disclosed herein is also a method that prevents the machine from moving as long as an unsafe state is present during coupling and/or decoupling of the tool. The method may include to only allow the tool holder to move, in particular during above described steps i), v) and vi) and when it is sensed that the front bracket pin is engaged in the hook shaped recess and the actuator is in the retracted state or position. The method may allow to move the machine when it is detected that the front bracket pin is disengaging during step vii) and when it sensed that the rear bracket pin is not engaged and not secured in the cut out.

BRIEF DESCRIPTION OF THE DRAWINGS

The present invention will now be described, for exemplary purposes, in more detail by way of an embodiment(s) and with reference to the enclosed drawings, in which.

DETAILED DESCRIPTION

Turning now to the figures two embodiments are herewith described in more detail using reference numbers and figures. The invention may be applicable in many ways, which means the two embodiments are in no way limiting to the invention. A first embodiment is shown and explained referring to FIGS. 1 to 3*d*. A second embodiment is shown and explained referring to FIGS. 4 to 6.

Figure 1:
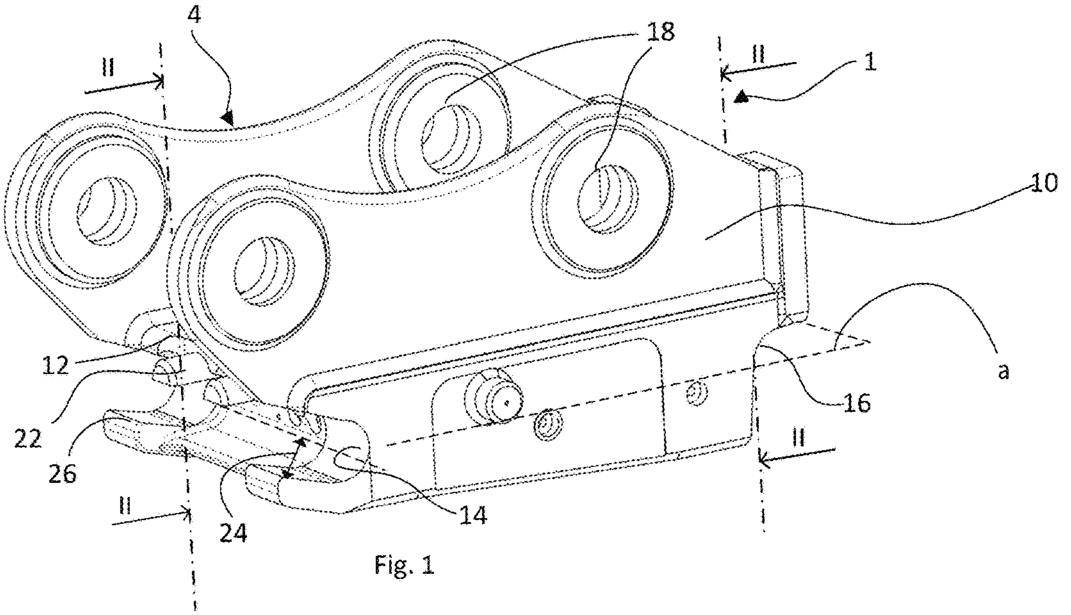
FIG. 1 schematically illustrates a tool holder according to a first embodiment of the invention.

FIG. 1 illustrates a tool holder 1 according to a first embodiment of the invention. The tool holder 1 comprises a frame 4 having two side plates 10 some kind of a web 12 and a connector 18 for coupling the tool holder 1 to a machine arm, which connector is shown in the form of two loops in each of the side plates 10. The frame 4 may be designed in another way, it may for example be cut from a block of steel or it may be designed as a more or less rectangular solid or the like.

The frame 4 further comprises a hook shaped recess 14 and a cut out 16 arranged at a distance from one another on opposite corners of the frame 4 as shown in FIG. 1. The hook shaped recess 14 comprises an opening 24 that allows a front bracket pin 102 of a tool 100 to enter the hook shaped recess 14 as illustrated in FIGS. 2*a* to 3*d*, depending on the position of an actuator 2 and a securing assembly 22 in the form of a pair of lock fingers 22 (c.f. FIGS. 2*a* to 3*d*). In FIG. 1 the opening 24 is limited, which is indicated by the dashed line extending from the securing assembly 22, so that a bracket pin (not shown) cannot exit nor enter the hook shaped recess 14. Still referring to FIG. 1 the hook shaped recess 14 further comprises a lower receiver part 26 that is bent slightly upwards as seen versus a horizontal plane a) as indicated in FIG. 1. The lower receiver part 26 may also be bent upwards so that the hook shaped recess 14 defines a proper hook.

From FIG. 1 it can be seen that the securing assembly 22 changes the size of the opening depending on its position. The securing assembly 22 is shown in the form of pair of securing fingers or lock fingers. This will be further explained referring to FIGS. 2*a* to 2*d*, which illustrate a cross sectional view onto a cut along plane II-II, as indicated in FIG. 1.

FIGS. 2*a* to 2*d* illustrate a coupling sequence between a tool 100 comprising a front bracket pin 102 and a rear bracket pin 104 and a tool holder 1 according to the invention.

Figure 2A:
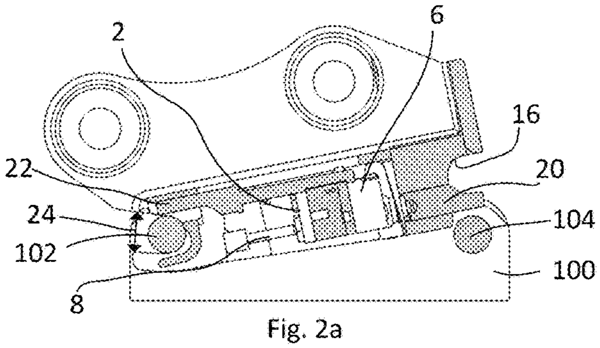
FIGS. 2*a* to 2*d* schematically illustrate a coupling sequence between the tool holder of FIG. 1 shown in a cross-sectional view and a tool and a front- and rear bracket pin, thereof respectively, for illustrative purposes.
Figure 2B:
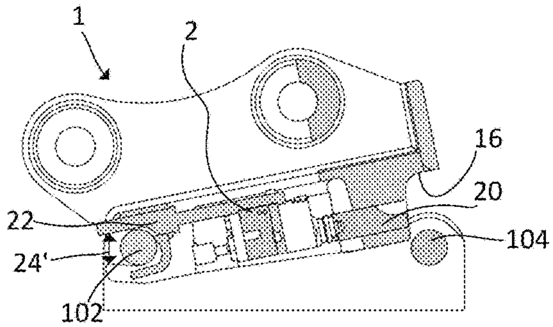
Figure 2C:
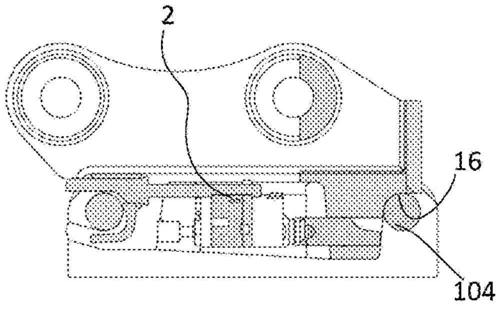
Figure 2D:
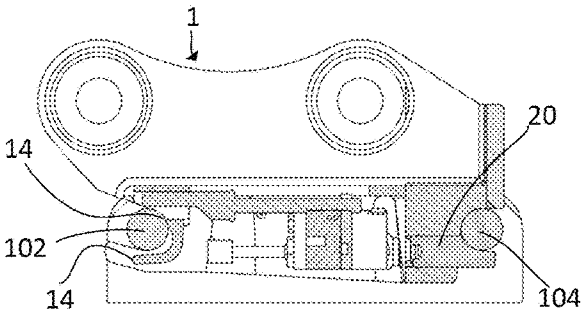

FIG. 2*a* illustrates a hooking i) of the front bracket pin 102 into the hook shaped recess 14. The actuator 2 is in an extended position so that the securing assembly 22 does not change the opening 24 of the hook shaped recess 14. In FIG. 2*a* a locking element 20 of the actuator 2 is blocking the rear bracket pin 104 from entering into the cut out 16. Once the front bracket pin 102 is embedded snug in the hook shaped recess 102, the actuator 2 is retracted, as shown in FIG. 2*b*, which leads to a secure locking of the front bracket pin 102 in the hook shaped recess 14 via the securing assembly 22. Once the actuator 2 is in the retracted position and the opening 24' is limited in size due the securing assembly 22, the front bracket pin 102 cannot exit the hook shaped recess 14 any longer and the next sequence of the coupling can be performed as illustrated in FIG. 2*c*. In FIG. 2*c* the tilting ii) of the tool holder 1 is illustrated. The rear bracket pin 104 becomes snug embedded in the cut out 16 when the tool holder 1 is tilted. Once the rear bracket pin 104 is snug embedded in the cut out 16, the actuator 2 is extended iii) and the locking element 20 is locking the rear bracket pin 104 in the cut out 16 as illustrated in FIG. 2*d*. Due to form restriction by the cut out 16, the hook shaped recess 14, the locking element 20 and the lower receiver part 26 of the hook shaped recess 14, the rear bracket pin 104 and the front bracket pin 102 are securely connected to the tool holder 1.

FIGS. 3*a* to 3*d* illustrate a decoupling sequence of the tool holder 1 from the tool 100 with the front bracket pin 102 and the rear bracket pin 104.

Figure 3A:
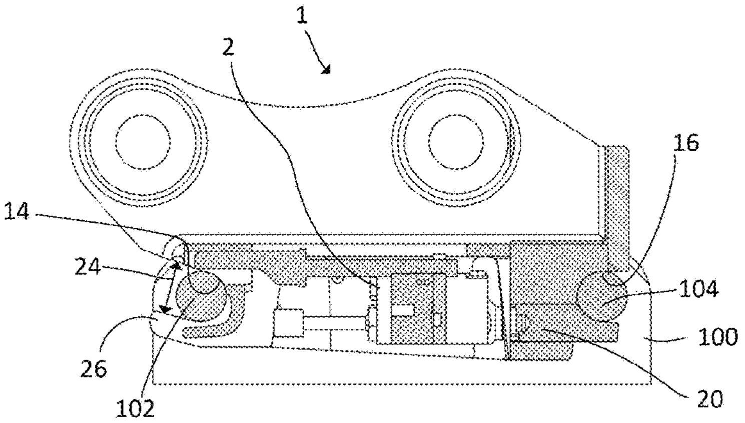
FIGS. 3*a* to 3*d* schematically illustrate a decoupling sequence between the tool holder of FIG. 1 shown in the cross-sectional view and the tool and the front- and rear bracket pin, thereof respectively, for illustrative purposes.
Figure 3B:
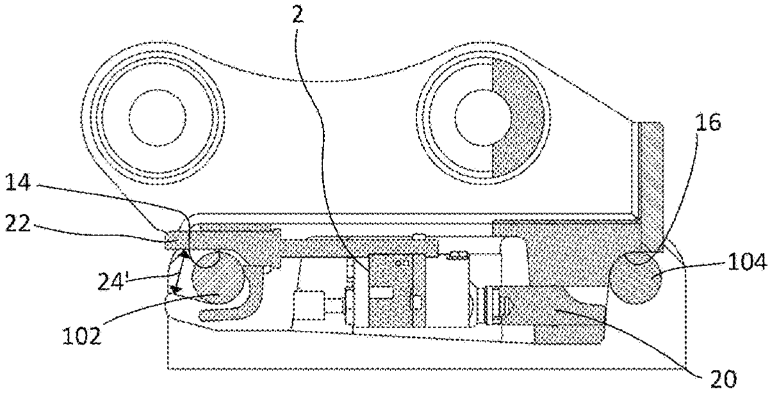

FIG. 3*a* illustrates the tool holder 1 with the actuator 2 in an extended position with the locking element 20 changing the shape of the cut out 16 so that the rear bracket pin 104 of the tool 100 cannot exit the tool holder 1. The opening 24 is not limited in its size but the lower receiver part 26 still blocks the front bracket pin 102 from disengaging while the rear bracket pin 104 is blocked from disengaging by the locking element 20. The tool 100 is typically put iv) on the ground in a stable position in this configuration. Once the tool 100 is safely put on the ground, the decoupling sequence can begin by moving v) the actuator 2 from the extended position into the retracted position so that the locking element 20 is withdrawn and does therewith not change the shape of the cut out 16 any longer which means that the rear bracket pin 104 is free for disengaging or decoupling from the cut out 16, as shown in FIG. 3*b*. At the same time the securing assembly 22 or pair of securing fingers is/are moved so that it limits the size of the opening 24' of the hook shaped recess 14, which opening 24' is therewith preventing the front bracket pin 102 from exiting the hook shaped recess 14 and thus providing additional safety, since a fall of the tool 1 is basically impossible.

Figure 3C:
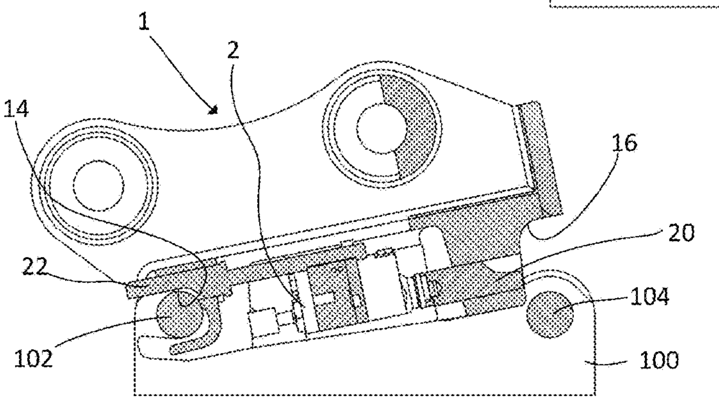
Figure 3D:
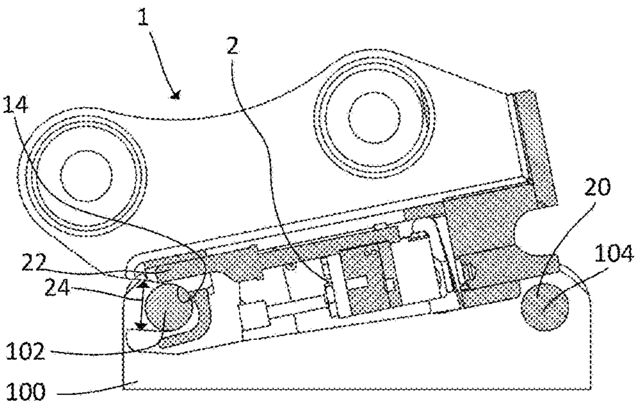

FIG. 3*c* illustrates the step of tilting vi) of the tool holder 1 once the actuator 2 is in the retracted position. During the tilting vi) the rear bracket pin 104 disengages from the cut out 16. Due to the form restriction in the hook shaped recess 14, which form restriction is formed by the securing assembly 22, the front bracket pin 102 cannot exit the hook shaped recess 14. Once the rear bracket pin 104 is disengaged from the cut out 16, the actuator 2 is moved into an extended position as shown in FIG. 3*d*. Moving the actuator 2 into the extended position enlarges the opening 24 again since the securing assembly 22 is moved out of vicinity of the hook shaped recess 14. Once the actuator 2 is in the extended position the tool holder 1 can be disengaged from the front bracket pin 102 and thereby release the tool 100 by moving the tool holder 1 backwards towards the rear bracket pin 104 and upwards away from the tool holder 100.

The basic principle of the invention has now been described referring to a first embodiment shown in FIGS. 1 to 3*d*. The same sequence and method as described previously can be achieved and performed using a second embodiment of the tool holder 1', herewith explained referring to FIGS. 4 to 6. Similar reference numbers describe similar elements. The tool holder 1' according to FIG. 4 works in a very similar principle as the one described in connection with FIGS. 1 to 3*d*.

Figure 4:
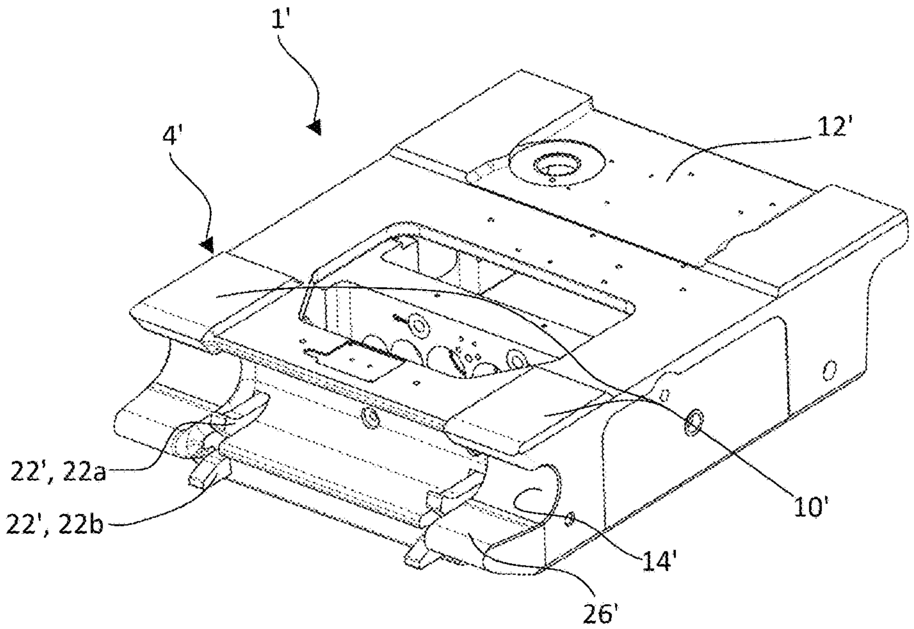
FIG. 4 schematically illustrates a tool holder according to a second embodiment of the invention.

FIG. 4 illustrates a tool holder 1' comprising a frame 4' and a hook shaped recess 14'. The frame 4' is illustrated comprising its two side plates 10' and the web 12' interconnecting the side plates 10'. The tool holder 1' comprises a securing assembly 22' in the form of a latch 22*a* and a securing finger 22*b* that can limit the opening 240' when the actuator 2 is in the retracted position. The securing finger or locking finger 22*b* is pushing the latch 22*a* upwards when the actuator 2' is in the retracted position, which again limits the size of the opening 240' to a size smaller than the diameter of the front bracket pin 102. This will prevent the front bracket pin from exiting the hook shaped recess 14'. This is well visible in FIG. 5. The pivoting point of the latch 22*a* is fixed to the frame 4'. The securing finger 22*b* may comprise a ramp or the like at its free end so that the latch 22*a* can be easily scoop up when the actuator 2 moves into the retracted position. Each latch 22*a* and securing finger 22*b* move at least more or less in the same movement plane so that the securing finger 22*b* can interact with the latch 22*a* and scoop the latter or release it. In the position or situation shown in FIG. 5, the tool 100 can either be locked by moving the actuator 2' to the extended position as shown in FIG. 6 or the tool holder 1' may be tilted to start the decoupling sequence by disengaging the rear bracket pin 104 from the cut out 16' as described in FIGS. 3*a* to 3*d* referring to the first embodiment of the tool holder 1.

Figure 6:
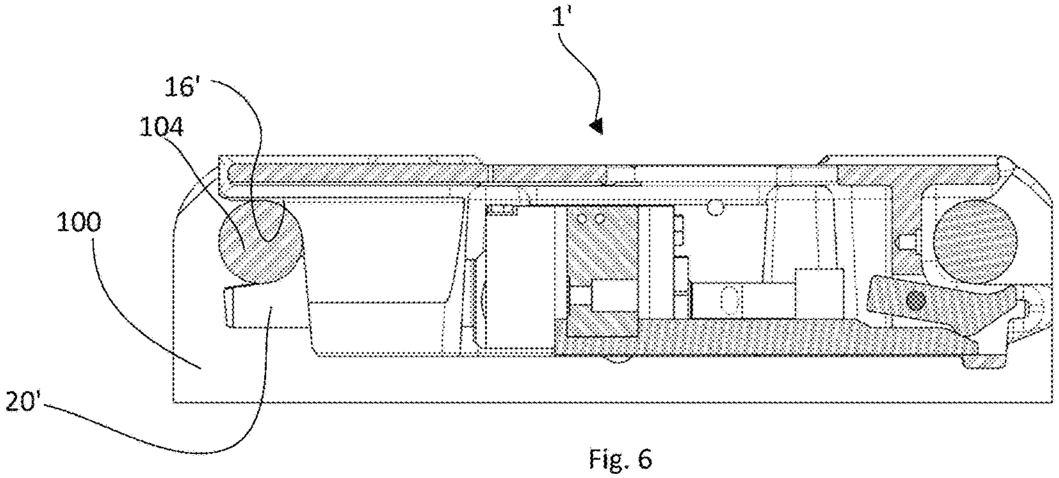

FIG. 6 finally illustrates the form-fit locking of the tool 100 in the tool holder 1'. The rear bracket pin 104 is locked in the cut out 16' because a locking element 20' is changing the shape of the cut out 16' due to the extended position of the actuator 2'. The locking element 20' and the securing finger 22*b* are connected to the actuator 2'. The locking element 20' and the securing finger 22*b* are extending in opposite ways from the actuator 2' along a direction of movement path of the actuator 2'.

The hook shaped recess 14' also comprises a lower receiver part 26' that makes it impossible to disengage the tool 100 from the tool holder 1'.

The method steps described in connection with FIGS. 2*a* to 2*d* for coupling the tool 100 to the tool holder 1 can be applied and used in the same manner as with the tool holder 1' illustrated in FIGS. 4 o 6. Similarly, the sequence for decoupling 3*a* to 3*d* can also be applied or used with the tool holder 1' according to the second embodiment.

The invention has now been described according to the FIGS. 1 to 6. The tool holder 1, 1' according to the first and the second embodiment significantly improve safety since the front bracket pin 102 is typically securely locked when the rear bracket pin 104 is snug embedded in the hook shaped recess 14, 14'. This increases safety among others during manoeuvring, decoupling and coupling of the tool 100, as previously explained.

Even if the rear bracket pin 104 is jammed by the locking element 20, 20' during coupling, the tool 100 is still secured in the tool holder 1, 1' by the securing assembly 22, 22' as explained, since the actuator 2, 2' is still in the retracted position when the locking element 20, 20' is jammed and therewith the opening 24, 24', 240, 240' is still limited so that the front bracket pin 102 cannot break free or disengage from the hook shaped recess 14, 14'.

Figure 5:
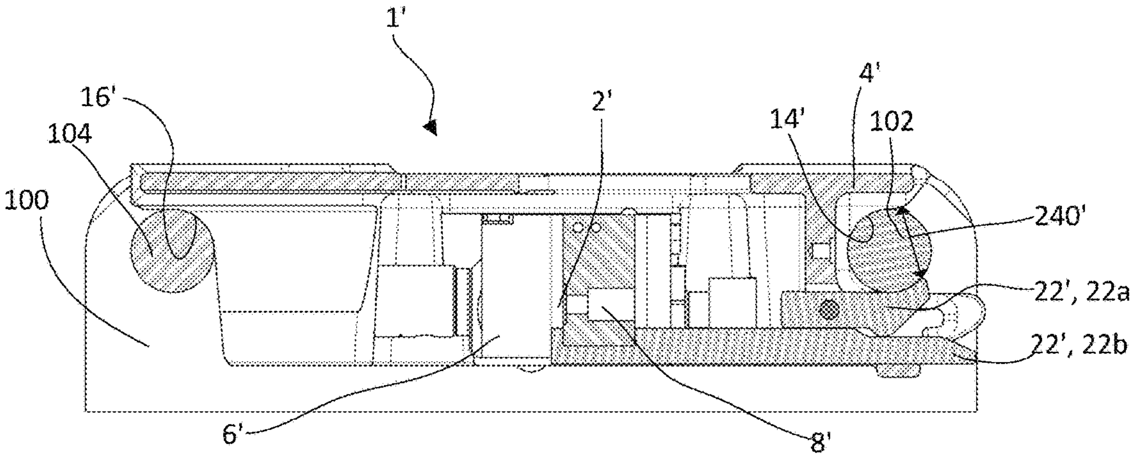
FIG. 5 schematically illustrates a cross-sectional view of the tool holder according to FIG. 4, and FIG. 6 schematically illustrates another cross-sectional view of the tool holder according to FIG. 4.

Referring to FIGS. 2*a* and 5 the actuator 2, 2' may comprise a rod 8, 8' and a housing 6, 6' into which the rod 8, 8' can retract. The actuator 2, 2' may be a hydraulic or pneumatic cylinder. The locking element 20, 20' and the securing finger or securing element 22*a*, 22' may be fixedly connected to the housing 6, 6' so that they extend from the housing in opposite directions. The housing 6, 6' and the rod 8, 8' are indicated in FIGS. 2*a* and 5. The housing 6, 6' may be configured to move in a motion link in the frame 4, 4' when the actuator 2, 2' is extended and retracted.

The securing assembly 22 according to both embodiments may comprise a pair of securing fingers 22 for instance extending from each leg of a H-cylinder housing. In addition, the second embodiment may comprise a pair of latches 22*a*. The locking element 20, 20' may also be designed as a pair of locking elements in both embodiments. The pair of securing fingers 22, 22*b* and/or latches 22*a* and the pair of locking fingers 20, 20' may be arranged close to or at the two sides 10, 10' of the frame 4, 4'. The invention however also works without providing a pair of securing fingers, latches or locking elements but with at least one of each.

The invention claimed is:

1. A tool holder for a machine comprising:

a frame; and an actuator that can be moved from a retracted state to an extended state and back, wherein the frame comprises a hook shaped recess having an opening and a cut out arranged at a distance from the hook shaped recess, so that a front bracket pin of a tool can releasably connect to the hook shaped recess by entering the opening and a rear bracket pin of the tool can releasably connect to the cut out, wherein the actuator is fixedly connected to the frame with one end, the actuator further comprising a locking element that is designed to change the shape of the cut out in the extended state of the actuator, wherein the actuator further comprises a securing assembly designed to reduce the size of the opening of the hook shaped recess in the retracted state of the actuator, wherein the rear bracket pin can enter the cut out in the retracted state of the actuator and wherein the front bracket pin can enter the hook shaped recess in the extended state of the actuator;

wherein the securing assembly comprises a securing finger fixedly connected to the actuator; and wherein the actuator further comprises a rod and a housing into which the rod can retract and from which the rod can extend, wherein the rod is connected to the frame and wherein the bousing is moving in relation to the frame when the actuator is moving between the retracted and the extended state and wherein the securing finger and the locking element are fixedly connected to the housing.

2. The tool holder according to claim 1, wherein the locking element is designed to change the shape of the cut out from a cut out to a hook shaped cut out as seen in a cross-sectional plane being cut through the tool holder and the cut out, said cross sectional plane being oriented perpendicular to a longitudinal axis of the rear bracket pin of the tool, when said rear bracket pin is snug embedded in the cut out.

3. The tool holder according to claim 1, wherein the opening is equal or greater than a diameter of the rear- or front bracket pin of the tool, when the actuator is in the extended state, and wherein the opening is smaller than a diameter of the rear- or front bracket pin of the tool, when the actuator is in the retracted state.

4. The tool holder according to claim 3, wherein the size of the opening is measured in a cross-sectional plane being cut through the tool holder and the hook shaped recess, said cross sectional plane being oriented perpendicular to a longitudinal axis of the front bracket pin of the tool, when said front bracket pin is snug embedded in the hook shaped recess.

5. The tool holder according to claim 1, wherein the securing assembly and the locking element extend in opposite directions from the housing and wherein said opposite directions are parallel to a movement path defined by the actuator.

6. The tool holder according to claim 1, wherein the frame comprises at least two side plates and a web, the web interconnecting the at least two side plates, said side plates being arranged parallel to one another and wherein each of the at least two side plates comprise the cut out and the hook shaped recess.

7. The tool holder according to claim 1, wherein the actuator is connected to a web and wherein the frame further comprises a motion link in which a part of the housing is engaged for controlling the movement of the housing when the actuator is extending and retracting.

8. The tool holder according to claim 1, wherein the housing of the actuator is H-shaped, wherein each leg of the H-shape comprises one hydraulic or pneumatic cylinder.

9. The tool holder according to claim 1, wherein the securing assembly comprises a latch and the securing finger, the securing finger being fixedly connected to the actuator and the latch being design to be moved by the securing finger to change the size of the opening when the actuator is in the retracted state.

10. The tool holder according to claim 8, wherein the securing finger comprises a ramp at a free end thereof.

11. The tool holder according to claim 2, wherein the opening is equal or greater than a diameter of the rear- or front bracket pin of the tool, when the actuator is in the extended state, and wherein the opening is smaller than a diameter of the rear- or front bracket pin of the tool, when the actuator is in the retracted state.

12. The tool holder according to claim 3, the actuator further comprising a rod and a housing into which the rod can retract and from which the rod can extend, wherein the rod is connected to the frame and wherein the housing is moving in relation to the frame when the actuator is moving between the retracted and the extended state and wherein the securing assembly and the locking element are fixedly connected to the housing.

13. The tool holder according to claim 2, wherein the frame comprises at least two side plates and a web, the web interconnecting the at least two side plates, said side plates being arranged parallel to one another and wherein each of the at least two side plates comprise the cut out and the hook shaped recess.

14. The tool holder according to claim 3, wherein the frame comprises at least two side plates and a web, the web interconnecting the at least two side plates, said side plates being arranged parallel to one another and wherein each of the at least two side plates comprise the cut out and the hook shaped recess.

15. The tool holder according to claim 4, wherein the frame comprises at least two side plates and a web, the web interconnecting the at least two side plates, said side plates being arranged parallel to one another and wherein each of the at least two side plates comprise the cut out and the hook shaped recess.

16. The tool holder according to claim 1, wherein the frame comprises at least two side plates and a web, the web interconnecting the at least two side plates, said side plates being arranged parallel to one another and wherein each of the at least two side plates comprise the cut out and the hook shaped recess.

17. The tool holder according to claim 5, wherein the frame comprises at least two side plates and a web, the web interconnecting the at least two side plates, said side plates being arranged parallel to one another and wherein each of the at least two side plates comprise the cut out and the hook shaped recess.

* * * * *